United States Patent [19]

Praefcke et al.

[11] Patent Number: 4,713,196
[45] Date of Patent: Dec. 15, 1987

[54] POLYMER COMPOSITIONS EXHIBITING LIQUID-CRYSTALLINE PHASES

[75] Inventors: Klaus Praefcke; Bernd Kohne, both of Berlin; Eike Poetsch, Mühltal; Claus P. Herz, Heidelberg, all of Fed. Rep. of Germany

[73] Assignee: Merck Patent Gesellschaft mit beschränkter Haftung, Darmstadt, Fed. Rep. of Germany

[21] Appl. No.: 766,179

[22] Filed: Aug. 16, 1985

[30] Foreign Application Priority Data

Aug. 18, 1984 [DE] Fed. Rep. of Germany ....... 3430482

[51] Int. Cl.$^4$ .................... C09K 19/52; C09K 19/06; C09K 19/38; G02F 1/13
[52] U.S. Cl. ............... 252/299.01; 252/299.6; 252/299.63; 252/600; 252/582; 428/1; 350/350 R; 528/25; 528/37; 528/374; 525/479
[58] Field of Search ........... 252/299.01, 299.6, 299.63; 528/25, 26, 27, 28, 29, 37, 374; 428/1; 350/350 R; 525/479

[56] References Cited

U.S. PATENT DOCUMENTS

| | | | |
|---|---|---|---|
| 4,293,435 | 10/1981 | Portugall et al. | 252/299.01 |
| 4,358,391 | 11/1982 | Finkelmann et al. | 252/299.01 |
| 4,388,453 | 6/1983 | Finkelmann et al. | 252/299.01 |
| 4,410,570 | 10/1983 | Kreuzer et al. | 252/299.01 |
| 4,578,210 | 3/1986 | Praefcke et al. | 252/299.6 |

FOREIGN PATENT DOCUMENTS

3334056  4/1985  Fed. Rep. of Germany ........... 252/299.01

OTHER PUBLICATIONS

Tinh et al., Liq. Cryst. Ordered Fluids, vol. 4, 1984, pp. 1123-1130, from Proceedings of 1982 Amer. Chem. Soc. Symposium in USA.
Chandrasekhar, Indian Journal Pure Appl. Phys., Sep. 1981, pp. 769-773.
Chandrasekhar, MCLC, 1981, vol. 63, pp. 171-180.
Destrade et al., MCLC, 1981, vol. 71, pp. 111-135.
Kelker et al., MCLC, 1979, vol. 49, pp. 175-177.
Gordon ed., Liquid Crystal Polymers II/III, 1984, pp. 16-50, 101-103.
Ringsdorf et al., Makromol. Chem., 1982, pp. 557-562.
Ringsdorf et al., British Polymer Journal, 1981, vol. 13, pp. 43-46.
Paleos et al., J. of Polymer Science, Polymer Chem., 1981, vol. 19, pp. 1427-1433.
Gray, Polymer Liquid Crystals, 1982, pp. 1-33.

Primary Examiner—Teddy S. Gron
Assistant Examiner—J. E. Thomas
Attorney, Agent, or Firm—Millen & White

[57] ABSTRACT

Polymer compositions exhibiting liquid-crystalline phases contain chemically bonded mesogenic groups of the formula Ia and/or Ib:

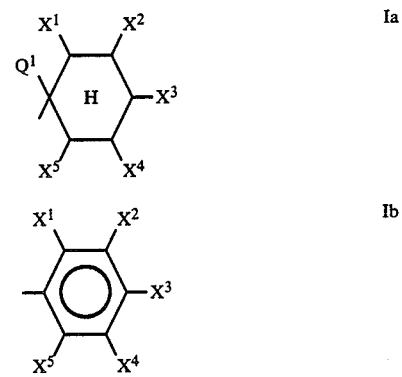

in which
$Q^1$ is H, alkyl or alkoxy having 1-5 C atoms, F, Cl, Br or CN,
$X^1$ to $X^5$ each, independently of one another, are H or an alkyl group having up to 15 C atoms, in which it is also possible for one or two non-adjacent $CH_2$ groups to be replaced by a group from the group comprising —O—, —S—, —O—CO—O—, O—CO—NH—, —CO—, —CO—O—, —CO—S—, —S—CO—, —SO— and —SO$_2$—.

Process for the preparation of polymer compositions of this type comprises the polymerization or grafting of suitable monomers.

Polymer compositions of this type are used as substrates in electronics for the fiber and foil techniques.

16 Claims, No Drawings

POLYMER COMPOSITIONS EXHIBITING LIQUID-CRYSTALLINE PHASES

BACKGROUND OF THE INVENTION

The invention relates to polymer compositions exhibiting liquid-crystalline phases.

A large number of liquid-crystalline polymers has already been disclosed, for example polyacrylic and polymethacrylic esters modified with 4'-cyanobiphenyl-4-yl as the mesogenic group. The nematic phases of polymer compositions of these types are usually found at temperatures above 100°. Relatively highly ordered, highly viscous smectic polymers are frequently obtained by polymerization of nematic or cholesteric monomers. Furthermore, polymer compositions having rod-like mesogenic side-groups frequently lead to crystalline polymers having no mesomorphic properties.

SUMMARY OF THE INVENTION

It is an object of the present invention to provide polymer compositions which exhibit liquid-crystalline phases and which do not have, or have to only a slight extent, the disadvantages described.

Upon further study of the specification and appended claims, further objects and advantages of this invention will become apparent to those skilled in the art.

It has now been found that polymer compositions which contain chemically bonded mesogenic groups of the formula Ia and/or Ib exhibit surprisingly wide mesophase ranges, a birefringence which is variable within wide limits and a positive and negative diamagnetic anisotropy. Moreover, they can easily be processed to give articles of any desired shape having anisotropic properties, and they exhibit high chemical stability.

The invention relates to polymer compositions exhibiting liquid-crystalline phases and containing chemically bonded, where appropriate by means of a spacer, mesogenic groups, characterised in that these mesogenic groups correspond to the formula Ia and/or Ib

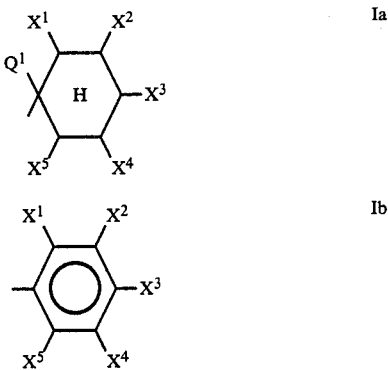

in which $Q^1$ is H, alkyl or alkoxy having 1–5 C atoms, F, Cl, Br or CN, $X^1$ to $X^5$ each, independently of one another, are H or an alkyl group having up to 15 C atoms, in which it is also possible for one or two non-adjacent $CH_2$ groups to be replaced by a group from the group comprising —O—, —S—, —O—CO—O, —O—CO—NH—, —CO—, —CO—O—, —CO—S—, —S—CO—, —SO— and —$SO_2$—, at least two of the substituents $X^1$ to $X^5$ being different from H.

DETAILED DISCUSSION

In the abovementioned radicals of the formula Ia, $Q^1$ is preferably H or unbranched alkyl, preferably having 1 to 4 C atoms, in particular methyl or ethyl, and particularly preferably CN.

In the radicals $X^1$ to $X^5$, preferably one $CH_2$ group in each case is replaced by a functional group, in particular those which form the bond to the central carbocycle.

$X^1$ to $X^5$ preferably contains —O—, —S—, —CO—, —CO—O—, —SO— and —$SO_2$—, in particular —O—, —S— and —$SO_2$—.

Preferably, at least 3 of the substituents $X^1$ to $X^5$ are different from H, in particular $X^1$, $X^3$ and $X^5$. Additional preferred mesogenic groups of the formula Ia and/or Ib are those in which all the substituents $X^1$ to $X^5$ are different from H, in particular $X^1$ to $X^5$ being identical.

Accordingly, the preferred meanings of $X^1$ to $X^5$ are: methoxy, ethoxy, propoxy, 1-methylethoxy, butoxy, 1-methylpropoxy, 2-methylpropoxy, 1,1-dimethylethoxy, pentoxy, hexoxy, heptoxy, octoxy, nonoxy, decoxy, undecoxy, dodecoxy, tridecoxy, tetradecoxy; methylthio, ethylthio, propylthio, 1-methylethylthio, butylthio, 1-methylpropylthio, 2-methylpropylthio, 1,1-dimethylethylthio, pentylthio, hexylthio, heptylthio, octylthio, nonylthio, decylthio, undecylthio, dodecylthio, tridecylthio, tetradecylthio; acetyl, propionyl, butyryl, 2-methylpropionyl, 3-methylpropionyl, pentanoyl, pivaloyl, hexanoyl, heptanoyl, octanoyl, nonanoyl, decanoyl, undecanoyl, dodecanoyl, tridecanoyl, tetradecanoyl; methoxycarbonyl, ethoxycarbonyl, propoxycarbonyl, 1-methylethoxycarbonyl, butoxycarbonyl, 1-methylpropoxycarbonyl, 1,1-dimethylethoxycarbonyl, pentoxycarbonyl, hexoxycarbonyl, heptoxycarbonyl, octoxycarbonyl, nonoxycarbonyl, decoxycarbonyl, undecoxycarbonyl, dodecoxycarbonyl, tridecoxycarbonyl, tetradecoxycarbonyl; methylsulfinyl, ethylsulfinyl, propylsulfinyl, 1-methylethylsulfinyl, butylsulfinyl, 1-methylpropylsulfinyl, 2-methylpropylsulfinyl, 1,1-dimethylethylsulfinyl, pentylsulfinyl, hexylsulfinyl, heptylsulfinyl, octylsulfinyl, nonylsulfinyl, decylsulfinyl, undecylsulfinyl, dodecylsulfinyl, tridecylsulfinyl, tetradecylsulfinyl; methylsulfonyl, ethylsulfonyl, propylsulfonyl, 1-methylethylsulfonyl, butylsulfonyl, 1-methylpropylsulfonyl, 2-methylpropylsulfonyl, 1,1-dimethylethylsulfonyl, pentylsulfonyl, hexylsulfonyl, heptylsulfonyl, octylsulfonyl, nonylsulfonyl, decylsulfonyl, undecylsulfonyl, dodecylsulfonyl, tridecylsulfonyl and tetradecylsulfonyl.

The compounds corresponding to the mesogenic radicals of the formula Ia or Ib, in which the free valency is saturated by a group corresponding to $X^1$ to $X^5$ and in which, where appropriate, $Q^1$ is H, having already been disclosed as discotic liquid crystals [German Offenlegungsschrift No. 3,332,955; B. Kohne and K. Praefcke, Angew. Chem. 96 (1984), 70–71; Z. Luz, W. Poules, R. Poupko, K. Praefcke and B. Scheuble, 21st Bunsen-Collogium, TU Berlin, September/October 1983].

The mesogenic groups can be directly bonded to the polymer chain. However, it is preferable for these groups to be bonded to the polymer chain via an acyclic chain (spacer). The spacer can be, in particular, a substituted or unsubstituted alkylene group, it being possible for one or more non-adjacent $CH_2$ groups to be replaced by a group from the group comprising —O—, —S—, —O—CO—, —CO—O—, —S—CO—, —CO—S—, —SO— and —SO$_2$—. It is furthermore possible for two adjacent CH$_2$ groups in the alkylene group to be replaced by —C≡C— or —CH═CX— in which X is hydrogen, halogen, preferably fluorine or chlorine, CN or an alkyl group having 1 to 5 C atoms, preferably CH$_3$. Particularly preferred spacers are those of the formula III $$-(CH_2)_n-Q^2-\qquad\qquad III$$

in which $Q^2$ is a single bond or —CO—S—, —CO—O—, —O—CO—, —CO—, in particular —O—, —S—, —SO— or —SO$_2$—, and n is 3 to 20, preferably 10 to 15. X also represents suitable substituents on the alkylene portions of the spacers.

The invention furthermore relates to a process for the preparation of polymer compositions based on the formula Ia/b, and to their use as organic semiconductors in electronics, e.g., for the fiber and foil techniques.

Thus, it is possible for monomeric compounds of the formula II $$\text{Y-Spacer-M}\qquad\qquad II$$

in which M is a mesogenic group of the formula Ia/b, and Y is a functional group which is capable of polymerization, to be, where Y is an alkenyl group having 2-5 C atoms which is attached in the ω- or (ω-1)-position, polymerized. Y can be bonded to the spacer via a direct bond or via a group from the group comprising —O—, —S—, —SO—, —SO$_2$—, —CO—O—, —CO—NH—, —O—CO—NH— or O—CO—O—. Particularly preferred groups are —O—, —CO—O—, —CO—NH— and —S—, in particular —O— and —CO—O—.

The polymerization is carried out in a manner known per se, by the action of radiation, heat or electrical energy, and by the action of radical or ionic catalysts as described in, for example, Ocian, Principles of Polymerization, McGraw-Hill, New York. Suitable radiation energy is in the form of UV, Laser, X-ray and radioactive beams. Electrical energy can be generated by, for example, electrolytic processes. Examples of radical catalysts are potassium persulfate, dibenzoyl peroxide, azobisisobutyronitrile, di-tert.-butyl peroxide and cyclohexanone peroxide. Ionic catalysts are organic compounds of alkali metals, such as phenyllithium and naphthalenesodium, or Lewis acids, such as BF$_3$, AlCl$_3$, SnCl$_4$ and TiCl$_4$ or metal complexes in the form of aluminum or titanium compounds. The monomers can be polymerized in solution, suspension, emulsion or in mass.

It is possible, where Y is a hydroxyl, amino, alkenyl, mercapto, epoxy or carboxyl group, or one of the reactive derivatives thereof, to graft the compounds of the formula II onto a polymeric backbone. In such instances, Y is particularly preferably OH, NH$_2$, COOH or a reactive derivative, in particular OH or a reactive derivative of the carboxyl group. This grafting-on reaction can be carried out by methods known per se, such as, for example, esterification, amidation, transesterification, transamidation, acetalization or etherification, which are described in the literature [for example in standard works such as Houben-Weyl, Methoden der Org. Chemie (Methods of Org. Chemistry), published by Georg-Thieme, Stuttgart, or C. M. Paleos et al., J. Polym. Sci. Polym. Chem. 19 (1981) 1427].

A preferred grafting-on reaction comprises the reaction of monomers bearing mesogenic groups of the formula Ia/b with organopolysiloxanes. For this purpose, linear or cyclic hydrogen-organopolysiloxanes are reacted, as described in, for example, European Patent Specification No. 0,060,335, with ethylenically unsaturated mesogenic monomers of the formula II (Y is an alkenyl group having 2 to 5 C atoms which is located in the ω- or (ω-1)-position) in approximately equimolar amounts based on the amount of siloxane-hydrogen, in the presence of a catalyst promoting the addition of silane-hydrogen onto aliphatic multiple bonds.

Suitable polymeric backbones are, in principle, all the polymers whose chains exhibit a certain flexibility which is expressed by their viscosity. Typical values for suitable backbones are in the range of $10^3$–$10^5$ Ns/m$^2$.

These can be linear, branched or cyclic polymer chains. The degree of polymerization is normally at least 10, preferably 20–100. However, oligomers are also suitable, in particular cyclic oligomers having 3 to 15, in particular 4 to 7, monomer units.

Preferably, polymers with C—C main chains, in particular polyacrylates, polymethacrylates, poly-α-halogenoacrylates, poly-α-cyanoacrylates, polyacrylamides, polyacrylonitriles or polymethylenemalonates are used. Furthermore, polymers with heteroatoms in the main chain, for example polyethers, polyesters, polyamides, polyimides or polyurethanes or, in particular, polysiloxanes, are also preferred.

Appropriate end-functionalized compounds, that is to say compounds in which at least one of the side groups on the six-membered ring carries a functional group in the ω- or (ω-1)-position, can be prepared by methods which are known per se, as are described in the literature (for example in the standard works, such as Houben-Weyl, Methoden der organischen Chemie, published by Georg-Thieme, Stuttgart, or in German offenlegungsschrift No. 3,332,955), in particular under reaction conditions which are known and suitable for the reactions mentioned. It is also possible for this to make use of variants which are known per se but which are not mentioned here in detail.

Preferred starting materials are pentasubstituted halogenobenzenes (M-halogen), pentahalogenobenzenes [Y-spacer-C$_6$(halogen)$_5$], in which Y can optionally be masked by a protective group, scyllo-inositol derivatives [Y-spacer-C$_6$H$_5$(OH)$_5$], pentasubstituted scylloinositol derivatives (M—OH; M═Ia), myo-inosose, and pentasubstituted myo-inosose derivatives.

Thus, compounds of the formula IV

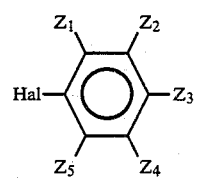

$$IV$$

in which
Hal is F, Cl, Br or I, and
$Z_1$ to $Z_5$ are each, independently of one another, H, OH or SH, at least two of the substituents $Z_1$ to $Z_5$ being different from H, can be converted by reaction with alkyl halides or sulfonates and possibly subsequent oxidation, or with carboxylic acids or thiocarboxylic acids or the reactive derivatives of carboxylic, thiocarboxylic, carbonic or carbamic acids, into compounds of the formula V,

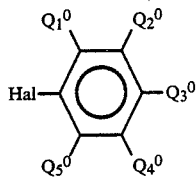

in which

Hal is F, Cl, Br or I and $Q_1$ to $Q_5$ is OR, SR, COR, OCO—OR, OCO—NHR, S—COR, SO—R or $SO_2$-R, in which R is an alkyl group having up to 14 C atoms, at least two of the substituents $Q_1$ to $Q_5$ being different from H.

Hal is preferably Cl or Br, and $Q_1$ to $Q_5$ are preferably OR, SR, COR, SO—R or $SO_2$-R, in particular OR, SR or $SO_2$R.

Compounds of the formula VII

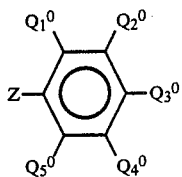

in which

Z is OH or SH, and $Q_1$ to $Q_5$ have the meaning indicated for formula V, and in which $Q_1$ to $Q_5$ are preferably OR, SR, COR, SO—R or $SO_2$R, in particular OR, SR or $SO_2$R, are obtained from compounds of the formula V or of the formula VI

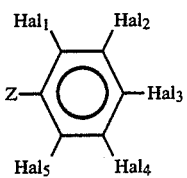

in which

Z is OH or SH, $Hal_1$ to $Hal_5$ are H, F, Cl, Br or I, at least two of the substituents $Hal_1$ to $Hal_5$ being different from H, and $Hal_1$ to $Hal_5$ preferably denoting Cl or Br, by reaction with alkali metal or alkaline earth metal hydroxides or hydrogen sulfides (in the case of the compounds of the formula V), or with alcohols, thioles, carboxylic acids or thiocarboxylic acids, or their reactive derivatives, or reactive derivatives of carbonic and carbamic acid.

Compounds of the formula VIII,

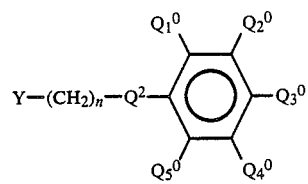

in which $Q^2$ has the meaning indicated in formula III and $Q_1$ to $Q_5$ have the meanings indicated in formula V, and n is 3 to 20, preferably 10–15, are obtained from compounds of the formula V or VII by reaction with alkyl halides or sulfonates and, where appropriate, subsequent oxidation, or with carboxylic acids or thiocarboxylic acids, or the reactive derivatives of carboxylic, thiocarboxylic, carbonic or carbamic acids, the terminal group Y, where appropriate, being provided with a suitable protective group, and Y has the meaning indicated in formula II. From compounds of the general formula IX,

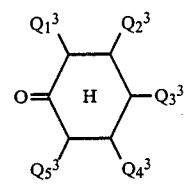

in which $Q_1$ to $Q_5$ is H, OH, SH, COOH or $CH_2OH$, at least two of the substituents $Q_1$ to $Q_5$ being different from H, and $Q_1$ to $Q_5$ preferably being OH, SH or COOH, can be obtained, by chemical reaction with alkyl halides or sulfonates and, where appropriate, subsequent oxidation, or with carboxylic acids or thiocarboxylic acids or the reactive derivatives of carboxylic, thiocarboxylic, carbonic or carbamic acids, compounds of the general formula X

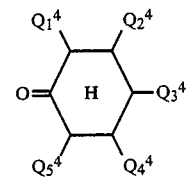

in which $Q_1$ to $Q_5$ are OR, SR, SO—R, $SO_2$—R, OCO—R, SCO—R, COOR or $CH_2OR$, in which R is an alkyl group having up to 14 C atoms, at least two of the substituents $Q_1$ to $Q_5$ being different from H, and $Q_1$ to $Q_5$ preferably being OR, SR, SO—R, $SO_2$—R or COOR, in particular OR, SR and $SO_2$—R.

From these, by chemical reaction with reducing or alkylating agents, compounds of the general formula XI are obtained

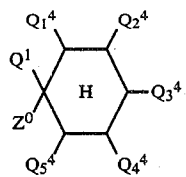

XI in which $Q_1$ to $Q_5$ have the meaning indicated in formula X, $Q^1$ is H, alkyl or alkoxy having 1–5 C atoms, F, Cl, Br or CN, and $Z^o$ is OH or SH, $Q^1$ preferably being H, alkyl or alkoxy having 1 to 5 C atoms, F, Cl or CN, in particular H, alkyl having 1 to 4 C atoms, F or CN, and $Q_1$ to $Q_5$ preferably being OR, SR, SO—R, $SO_2$—R or COOR, in particular OR, SR and $SO_2$—R.

From compounds of the formula X or XI are obtained, by reaction with alkyl halides or sulfonates and, where appropriate, subsequent oxidation, or with carboxylic acids or thiocarboxylic acids or the reactive derivatives of carboxylic, thiocarboxylic, carbonic or carbamic acids, the terminal group Y being, where appropriate, provided with a suitable protective group, compounds of the general formula XII

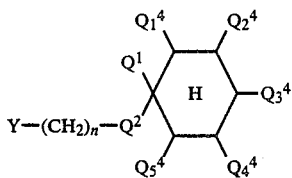

XII in which $Q_1$ to $Q_5$ have the meanings indicated in formula X, $Q^1$ has the meaning indicated in formula I, $Q^2$ has the meaning indicated in formula III, Y has the meaning indicated in formula II and n is 3–20, preferably 10–15. $Q^1$ is preferably H, alkyl or alkoxy having 1–5 C atoms, F, Cl or CN, in particular H, alkyl having 1–4 C atoms, F or CN, $Q^2$ is preferably —CO—S—, —O—, —S—, —CO—O—, —SO— or —$SO_2$—, in particular —O—, —S—, —$SO_2$— or —CO—O—. $Q_1$ to $Q_5$ are preferably identical and are OR, SR, SO—R or COOR, in particular OR, SR and $SO_2R$.

Some of the intermediates V and VII, VIII, IX, X, XI and XII are known, but most of them are new. They are prepared by methods which are known per se and are described in the literature (for example in standard works such as Houben-Weyl, Methoden der Organishcen Chemie, published by Georg-Thieme, Stuttgart), in particular under reaction conditions which are known and suitable for the reactions mentioned. It is also possible to make use for this of variants which are known per se but which are not mentioned here in detail. They are used for the preparation of the liquid-crystalline polymer compositions according to the invention.

The processes indicated for the preparation of V to XII are known per se (for example from standard works such as Houben-Weyl, Methoden der Org. Chemie, published by Georg-Thieme, (Stuttgart). Normally, the reaction conditions known for the reactions mentioned are observed. However, it is also possible to make use of variants which are known per se, but which are not mentioned here in detail.

Some of the starting materials IV, VI and IX are known (Beilstein 6 IV 1069, 7920). All the compounds IV, VI and IX can be prepared by processes known per se.

Some of the discotic phase ranges exhibited by the low molecular weight compounds of the formula II are wide. However, compounds of the formula II which exhibit no mesophases are also suitable for the preparation of the polymer compositions according to the invention.

The homopolymers or copolymers of the polymerizable compounds of the formula II or of their polymerizable derivatives are preferably prepared by radical polymerisation. The reaction is initiated by, for example, UV radiation or radical-forming agents. The monomers can be polymerized in solution or in the mass.

Copolymer compositions exhibiting liquid-crystalline phases according to the invention are obtained by copolymerization of polymerizable compounds of the formula II or of their polymerizable derivatives with monomers which carry no mesogenic radicals, which carry other mesogenic radicals (for example rod-like), which carry chiral radicals (for example German Offenlegungsschrift No. 2,831,909) or which carry dyestuff radicals (German Offenlegungsschrift No. 3,211,400). In general, in these copolymers, the % of all incorporated monomers which correspond to this invention (Ia or Ib) will vary from 100% to 10%, in accordance with the desired end properties using conventional considerations preferably 100–40%.

Copolymerization with monomers of these types, starting from a monomer mixture of concentration $X_1$, leads to a copolymer with the ratio of incorporation corresponding to the monomer concentration $X_1$ only if the copolymerization parameters of the monomeric components are of comparable magnitude. This is of particular importance when the intention is to prepare a copolymer of a particular composition without difficulty, for example without taking into account the reaction kinetics. For this reason, it is preferable to select monomeric components which have comparable copolymerization parameters, namely alkyl acrylates or methacrylates which primarily differ by the substituents on the alkyl chain.

Copolymerization with monomers which do not carry a mesogenic radical generally leads to a reduction in the glass temperature and in the clear point. It is frequently possible, by suitable choice of the spacer, to bring the mesophase range into the temperature range suitable for the particular application purpose.

It is possible in principle to use as the monomers with a chiral radical all compounds of this type having asymmetric C atoms. However, the compounds of the formula II, or their polymerizable derivatives, in which M is a mesogenic group of the formula Ia or Ib, in which one of the radicals $X^1$ to $X^5$ or, where appropriate, $Q^1$ is an alkyl group in which one $CH_2$ group is replaced by —$CHCH_3$—, are preferably used.

Finally, numerous other possibilities of variation result from the fact that the compounds according to the invention combine liquid-crystalline properties with typical polymer properties, such as ability to form layers, films and fibers, ease of deformability etc. These properties can be modified in a manner known per se by copolymerization or mixing with other components, by variation of the molecular weights, by additions of a very wide variety of inorganic or organic additives and metals and by many other treatments which are familiar to the polymer expert.

The polymer compositions according to the invention can be used as starting material for the preparation of organic glasses having anisotropic properties which can be modified within wide ranges.

This results in applications in, for example, the area of collectors of light and sunlight or in organic phototropic glasses. Furthermore, an important field of application is opened up in the area of optical memories.

Further possible applications are opened up in the area of magnetic memories. In particular, the compositions according to the invention are also suitable as a matrix for substances having non-linear optical properties for the production of "non-linear" optical components.

The various uses of the polymers of this invention are in accordance with conventional considerations, e.g., the preparation of fibres is disclosed in H. F. Mark, S. M. Atlas, E. Cernia: Man made Fibres: Science and Technology, Interscience Publ., New York, 1967–69; the fabrication of films and foils is disclosed in O. J. Sweeting: The Science and Technology of Polymer Films., Interscience Publ., New York, 1968+1970; electro-optic effects and applications of liquid crystal polymers are disclosed in H. J. Coles and R. Simon in L. L. Chapoy (ed.): Recent Advances in Liquid Crystalline Polymers, Elsevier, New York, 1985, which disclosure is being incorporated by reference herein.

The chemical reactions described above are generally disclosed in terms of their broadest application to the preparation of the compounds of this invention. Occasionally, the reactions may not be applicable as described to each compound included within the disclosed scope. The compounds for which this occurs will be readily recognized by those skilled in the art. In all such cases, either the reactions can be successfully performed by conventional modifications known to those skilled in the art, e.g., by appropriate protection of interfering groups, by changing to alternative conventional reagents, by routine modification of reaction conditions, etc., or other reactions disclosed herein or otherwise conventional, will be applicable to the preparation of the corresponding compounds of this invention. In all preparative methods, all starting materials are known or readily preparable from known starting materials.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

1a. 1.1 mol of pentachlorophenol, 1 mol of 1-bromo-10-decanol, 1 mol of NaH and 3 l of tetrahydrofuran are refluxed for 48 h; sodium chloride separates out. After filtration, the solvent is removed in vacuo, and the residue is washed twice with 5% sodium hydroxide solution, once with saturated sodium chloride solution and then with water. A viscous oil remains:

$^1$H—NMR (CD$_3$SOCD$_3$):

$\delta = 3.31$ (t, 2H), 3.24 (t, 2H), 2.60–2.71 (S, 1H), 1.21–1.94 (m, 6H).

1b. 50 mmol of NaH are added to a solution of 3 mmol of pentachloro compound 1a and 50 mmol of 1-mercaptotridecane in 150 ml of 1,3-dimethylimidazolidinone and, after the evolution of hydrogen has subsided, the mixture is heated at 100° under nitrogen for 2 h. For the working up, 500 ml of water are added and the mixture is extracted 3x with 200 ml of ether each time. The ether extracts are washed with water, dried and evaporated and the residue is a 65% yield of a pale yellow wax.

IR: $V_{OH}$ 3620 cm$^{-1}$.

1c. The pentakisthioether (0.1 mol) obtained in 1b is dissolved in 500 ml of dichloromethane and, with stirring, a solution of 200 g of 3-chloroperbenzoic acid in 1 l of dichloromethane is slowly added. The precipitate which has separated out after stirring at room temperature for 2 hours is filtered off with suction and dried. Yield: 86% of an amorphous solid.

IR (KBr): $V_{OH}$ 3624 cm$^{-1}$; $V_{SO}$ 1155 and 1325 cm$^{-1}$.

1d. 0.5 mol of methacryloyl chloride is added dropwise to a solution of 0.5 mol of alcohol 1c in 350 ml of absolute dichloromethane and 0.5 mol of triethylamine, while cooling in ice-water, in such a manner that the internal temperature does not exceed +5° C. After addition is complete, the mixture is stirred at room temperature for 1 h; the triethylammonium chloride which has separated out is filtered off with suction, and the filtrate is washed with water and dried. After removal of the solvent in vacuo, 88% of theory of a yellow oil remains.

IR: $V_{C=O}$ 1725 cm$^{-1}$.

1e. 0.5 mol of 10-[pentakis(2[tri]decylsulfonyl)-phenoxy]decyl methacrylate, obtained in 1d, and 0.2 mol of poly(methylsiloxane) (mean degree of polymerization about 35) are dissolved in 50 ml of dry benzene. While passing through nitrogen, 1 mg of a dicyclopentadienylplatinum dichloride catalyst is added, and the mixture is maintained at 80° C. for 6 h. The polymer is then precipitated by addition of ethanol.

EXAMPLE 2

2a. 0.2 mol of 9-mercapto-1-undecene is dissolved in 100 ml of phosphoric hexamethyltriamide and, with stirring, 0.2 mol of sodium hydride is added. After the H$_2$ evolution has subsided, 0.1 mol of pentakis(tridecylthio)chlorobenzene is added, and the mixture is stirred at 100° for 3 h. It is then poured onto 500 ml of water, extraction is carried out with 3×150 ml of ether and the combined extracts are washed with water and dried. After removal of the solvent in vacuo, 66% of theory of a dark oil remain, and this is reacted further without purification. 2b. 0.12 mol of a solution of diborane in THF is added dropwise, at 0°, to a solution of 0.1 mol of olefin 2a in 250 ml of absolute THF. After addition is complete, the mixture is stirred for a further 1 h at room temperature. Then 30 ml of 3M sodium hydroxide solution are added, followed by dropwise addition of 36 ml of 30% hydrogen peroxide solution. The mixture is stirred at 25°–30° for 1 h, and the alcohol which is formed is isolated by extraction with ether.

Yield: 93% of theory of a pale yellow oil; IR: $V_{OH}$ 3630 cm$^{-1}$ 2c. 10 ml of 85% hydrogen peroxide are added to a solution of 0.1 mol of the hexasulfide, obtained in 2b, in 300 ml of glacial acetic acid, and the mixture is stirred overnight at room temperature. The precipitate which has separated out is filtered off with suction, washed with ether, and is dried. In this way, 81% of theory of a yellow, amorphous hexasulfone are obtained.

IR (KBr): $V_{OH}$ 3620 cm$^{-1}$, $V_{SO}$ 1150 and 1325 cm$^{-1}$.

2d. 0.1 mol of (11-hydroxyundecylsulfonyl)pentakis(-tridecylsulfonyl)benzene 2c are dissolved in 150 ml of absolute dichloromethane and 0.1 mol of triethylamine and, at = +5°, 0.1 mol methacryloyl chloride is added. Thereafter, the mixture is stirred at 20° for 2 hr, then thoroughly washed with water, dried and evaporated in vacuo to give a residue.

IR (KBr) of the amorphous solid shows absorptions for the sulfonyl group ($V_{SO}$ 1155 and 1325 cm$^{-1}$) and carbonyl group ($V_{CO}$ 1730 cm$^{-1}$).

2e. A solution of 0.1 mol of 11-([pentakis(tridecylsulfonyl)]phenylsulfonyl)undecyl methacrylate 2d in 300 ml of tetrahydrofuran is irradiated under nitrogen with a high-pressure mercury immersion lamp for 4 h. The polymer can be precipitated as an opaque mass by addition of methanol.

EXAMPLE 3

Solutions of pentamethylcyclopentasiloxane (0.1 mol) and undec-10-enylthiopentakis(tridecylthio)benzene (1 mol) in THF are combined at 60°, 0.1 g of hexachloroplatinic(IV) acid is added, and the mixture is stirred at this temperature for 12 h. After removal of the solvent in vacuo and drying of the residue under high vacuum, 90% of theory of an amorphous solid are obtained.

IR$_{Si-O}$: 1050 cm$^{-1}$.

For the oxidation, the polysulfide obtained above is dissolved in glacial acetic acid and treated with excess 85% hydrogen peroxide. The sulfone, which is insoluble in glacial acetic acid, shows in the IR (KBr) bands for the sulfonyl groups at 1160 and 1330 cm$^{-1}$.

EXAMPLE 4

4a. A suspension of 0.1 mol of pentahydroxycyclohexanone, 0.1 mol of 1-bromoundecane and 0.1 mol of cesium carbonate in 300 ml of DMF is stirred at 100° C. for 3 h. The mixture is then poured onto 3 l of ice-water and extracted with 4×250 ml of dichloromethane. The combined extracts are washed with water and dried. 67% of theory of an oily product are obtained by evaporation in vacuo.

IR: $V_{C=O}$ 1715 cm$^{-1}$.

4b. A solution of methyl magnesium iodide prepared from 0.1 mol of methyl iodide and 0.1 gram atom of magnesium in 150 ml of ether is slowly added dropwise to a stirred solution of 0.1 mol of cyclohexane 4a in 100 ml of ether. The mixture is then heated to reflux for 1 h to complete the reaction. The reaction mixture is decomposed by addition of 200 ml of saturated ammonium chloride solution, the organic phase is separated off, and the mixture is extracted 2x more with 150 ml of ether each time. After washing with water, drying over sodium sulfate and removal of the solvent by distillation, 73% of theory of a virtually colorless oil are obtained:

IR: $V_{OH}$ 3615 cm$^{-1}$.

4c. A solution of 0.2 mol of undec-10-enoic acid in 100 ml of dichloromethane is added dropwise, at 5°-10°, to a solution of 0.2 mol of the tert. alcohol from 4b and 0.2 mol of dicyclohexylcarbodiimide in 400 ml of dichloromethane. After stirring at 20° for 2 h, the precipitated dicyclohexylurea is filtered off with suction, and the filtrate is evaporated to a residue.

IR: $V_{CO}$ 1745 cm$^{-1}$.

4d. 50 ml of 40% peracetic acid are added slowly, at 20°, to a solution of 0.1 mol of unsaturated ester 4c in 200 ml of ether. The mixture is allowed to stand for 20 h, and is then poured into a saturated aqueous solution of potassium carbonate, and the ether layer is separated off and dried with sodium sulfate. After removal of the solvent in vacuo under mild conditions, the epoxide remains as an unstable oil.

4e. The unsaturated ester (0.1 mol) obtained in 4d is dissolved in 200 ml of diglyme and, at a temperature of $\leq +5°$, 0.12 mol of a solution of diborane in THF is added. Thereafter the mixturre is stirred at RT for 2 h, and then 30 ml of 3M sodium hydroxide solution are added, followed by 36 ml of 30% hydrogen peroxide solution. The mixture is stirred at 20° for 2 h, and then 500 ml of ice-water are added and extraction is carried out with 3×200 ml of dichloromethane. The combined organic phases are dried with sodium sulfate. After filtration to remove the drying agent, 0.1 mol of triethylamine is added and, at 0°-5° C., 0.1 mol of acryloyl chloride is added. After stirring at 20° C. for 2 h, washing with ice-water and drying and removal of the solvent in vacuo, 68% of theory of oily unsaturated ester result.

IR: $V_{C=O}$ 1720 cm$^{-1}$.

4f. After addition of 0.5 g of azobis(isobutyronitrile) to a solution of 0.05 mol of 10-([2,4,6c-3,5t-pentakis(undecyloxy)-1t-methyl]cyclohexyl-1r-oxycarbonyl)decyl acrylate in 100 ml of toluene, the mixture is heated at 90° for 12 h. On cooling, the gel-like polymeric product separates out. Addition of ethanol leads to a filterable amorphous product.

EXAMPLE 5

5a. A solution of 0.1 mol of myo-inositol in 500 ml of THF is added dropwise to a suspension of 0.5 mol of sodium hydride in 1 l of the same solvent. After the evolution of hydrogen is complete, 0.5 mol of 1-bromoheptane is added. The mixture is stirred at 50° C. for 10 h, the sodium bromide which has separated out is filtered off, and the filtrate is evaporated to a residue. Reprecipitation from diisopropyl ether provides 81% of theory of pure product as an amorphous solid.

IR: $V_{OH}$ 3615 cm$^{-1}$.

5b. 0.5 mol of toluenesulfonyl chloride is added in portions to a solution of 0.5 mol of 2,4,6c-3,5t-pentakisheptyloxy-1r-cyclohexanol in 1 l of dichloromethane and 0.5 mol of triethylamine. After the reaction is complete, the mixture is washed several times with water, dried and evaporated. The remaining unstable tosylate is quickly reacted further by stirring a solution of it in 1.2 l of DMF with 1 mol of potassium ethylthioxanthate at 60° C. for 4 h. The mixture is then poured onto 4 l of ice-water, and extraction is carried out with 3×1 l of ether, which is dried over magnesium sulfate. After removal of the solvent, the remaining oily xanthate is heated to reflux for 2 h with 2 l of concentrated ammonia solution. The mixture is allowed to cool, and the oil which has separated out is extracted with ether and, after the latter has been removed in vacuo, 64% of theory (based on cyclohexanol 5a) of the desired mercaptan are obtained as a viscous yellow oil.

IR: $V_{SH}$ 2565 cm$^{-1}$.

5c. 0.1 mol of 11-bromoundecanol is added dropwise, at 20°, to a solution of 0.1 mol of mercaptan 5b in 350 ml of THF and 0.1 mol of triethylamine. After the mixture has been stirred at this temperature for a further 4 h, the triethylammonium bromide which has precipitated out is removed by filtration with suction, and the filtrate is evaporated to a residue. Yield 92% of theory.

IR: $V_{OH}$ 3515 cm$^{-1}$.

5d. 0.2 mol of the alcohol 5c obtained above is dissolved in 500 ml of dichloromethane and 0.2 mol of triethylamine. At +5°, 0.2 mol of methacryloyl chloride is added dropwise, the mixture is maintained at this temperature for 30 min, and then is stirred at room temperature for 1 h. It is washed to neutrality with water, dried, and the solvent is removed in vacuo under mild conditions. 78% of theory of a virtually colorless oil remain.

IR: $V_{C=O}$ 1725 cm$^{-1}$.

5e. A glass-like polymer is obtained in analogy to Example 1e from 11-([2,4,6c-3,5t-pentakis(heptyloxy)]-1r-cyclohexylthio)undecyl methacrylate 5d with poly(methylsiloxane-codimethylsiloxane).

EXAMPLE 6

6a. 0.6 mol of tosyl chloride is added in portions to 0.1 mol of scyllo-inositol in 250 ml of dichloromethane and 0.6 mol of triethylamine. The mixture is then stirred at room temperature for 2 h, thoroughly washed with ice-water and dried over sodium sulfate.

The tosylate which is obtained after removal of the solvent in vacuo under mild conditions is taken up in 800 ml of DMSO, 1 mol of potassium ethylthioxanthate is added, and the mixture is stirred at 65° C. for 6 h. It is allowed to cool to room temperature and, while simultaneously passing nitrogen through the reaction mixture, 500 ml of concentrated ammonia solution are added. The mixture is then heated to about 80° C. and, after 4 h, diluted to 5 l with ice-water and extracted by shaking several times with ether. The ether phases which have been washed with water, dried and evaporated leave behind 70% of theory of a yellow oil.

IR: $V_{SH}$ 1560 cm$^{-1}$.

6b. A mixture of 0.3 mol of (1,3,5c-2,4,6t)-hexamercaptocyclohexane 6a, 0.3 mol of 11-bromoundecanol, 500 ml of DMF and 0.15 mol of potassium carbonate is stirred at 50° C. for 2 h.

Then the solvent is removed in vacuo, 1 l of water is added to the residue, and it is extracted several times with ether. After the ether has been evaporated off, 94% of theory of alcohol remain.

IR: $V_{OH}$ 3620 cm$^{-1}$, $V_{SH}$ 2550 cm$^{-1}$.

6c. After addition of 0.5 mol of sodium hydroxide and 0.5 mol of 1-bromoheptane to 0.1 mol of the above pentamercapto compound 6b in 200 ml of ethanol, the mixture is heated to reflux under nitrogen for 10 h. After cooling to room temperature, the sodium bromide which has precipitated out is filtered off, and the filtrate is evaporated to a residue. The residue is taken up in ether, again filtered, and evaporated. In this way, 86% of theory of a dark yellow oil are obtained.

IR: $V_{OH}$ 3625 cm$^{-1}$.

6d. 0.2 mol of the polythio ether 6c is boiled with a 20% excess of 85% 3-chloroperbenzoic acid in 150 ml of chloroform for 36 h. After cooling, the solution is washed with sodium carbonate solution to remove acid, dried and evaporated. 96% of theory of an amorphous solid remain.

IR: $V_{OH}$ 3625 cm$^{-1}$, $V_{SO}$ 1150 and 1320 cm$^{-1}$.

6e. 0.1 mol of sulfone alcohol 6d, 0.1 mol of methacryloyl chloride and 200 ml of trifluoroacetic acid are stirred at 20° for 3 h. After evaporation, 89% of theory of oily ester are obtained.

IR: $V_{SO}$ 1150 and 1320 cm$^{-1}$, $V_{C=O}$ 1720 cm$^{-1}$.

6f. After addition of 0.01 mol of azobis(isobutyronitrile) to a solution of 0.5 mol of 10-([pentakis(heptylsulfonyl)-1r-cyclohexyl]sulfonyl)decyl methacrylate and 0.45 mol of poly(methylsiloxane) in 300 ml of tetrahydrofuran, the mixture is heated to reflux under nitrogen for 10 h. Addition of methanol precipitates the polymer.

EXAMPLE 7

7a. 0.5 mol of hexakis(2-hydroxyethyl)benzene, 0.5 mol of 11-bromoundecanoyl chloride and 700 ml of trifluoroacetic acid are stirred at room temperature for 2 h. After evaporation and the usual work-up, 92% of theory of the monoester are obtained as a colorless oil.

IR: $V_{OH}$ 3475 cm$^{-1}$, $V_{CO}$ 1745 cm$^{-1}$.

7b. 0.4 mol of the pentakis(hydroxyethyl) compound 7a, 2 mol of pentanoyl chloride and 500 ml of trifluoroacetic acid are stirred at room temperature for 3 h. After removal of the solvent by distillation, 95% of theory of the hexaester are obtained as an oil.

IR: $V_{C=O}$ 1740 cm$^{-1}$.

7c. 0.1 mol of methacryloyl chloride is slowly added dropwise, at 70°, to a mixture of 1 mol of hexaester 7b, 0.1 mol of potassium carbonate and 200 ml of DMF. After the reaction has lasted 6 h, the mixture is allowed to cool, 1 l of ice-water is added, and it is extracted several times with ether. After evaporation, the combined ether phases provide 68% of theory of oily methacrylate.

IR: $V_{C=O}$ 1725 and 1745 cm$^{-1}$.

7d. A glass-like polymer is obtained in analogy to Example 2e from 10-([pentakis(2-pentanoyloxyethyl)-phenyl]ethoxycarbonyl)decyl methacrylate and poly(methylsiloxanecodimethylsiloxane).

EXAMPLE 8

8a. 0.1 mol of (2,4,6c-3,5t)-pentakis(nonyloxy)-cyclohexanone, dissolved in 200 ml of absolute ether, is treated with 0.1 mol of an ethereal solution of (R)-2-methylbutyl magnesium bromide. After addition is complete, the mixture is heated to reflux for 30 min. It is allowed to cool and decomposed by addition of concentrated ammonium chloride solution. The organic phase is separated off, washed with water and dried. After removal of the solvent, 79% of theory of a viscous oil are obtained.

IR: $V_{OH}$ 3635 cm$^{-1}$.

8b. A solution of 0.2 mol of alcohol 8a in 150 ml of absolute pyridine is treated, at 0°-5°, with 0.1 mol of 11-hydroxyundecanoyl chloride. After stirring at this temperature for 2 h, the mixture is poured onto 1 kg of ice and the reaction product is isolated by extraction with ether. After removal of the solvent on a water-bath, 78% of theory of ester is obtained as a pale oil.

IR: $V_{CO}$ 1740 cm$^{-1}$.

8c. 0.1 mol of the above alcohol 8b in 250 ml of dichloromethane and 0.1 mol of triethylamine are treated, at 0°-5° C., with 0.1 mol of methacryloyl chloride. After stirring at this temperature for 2 h, the mixture is washed to neutrality with ice-water, dried over sodium sulfate and evaporated. 81% of theory of a viscous yellow oil remain.

IR: $V_{C=O}$ 1715 and 1740 cm$^{-1}$.

8d. A glass-like polymer is obtained in analogy to Example 3 from 10-([1t-((R)-2-methylbutyl)-2,4,6c-3,5t-pentakis(nonyloxy)-1r-cyclohexyl]oxycarbonyl)decyl acrylate 8c and poly(methylsiloxane) with the addition of hexachloroplatinic(IV) acid.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a polymer exhibiting a liquid-crystalline phase and having mesogenic groups chemically bonded directly to the polymer backbone or bonded thereto by an acyclic chain spacer group, the improvement wherein the mesogenic groups are groups of the formula Ia, or both Ia and Ib:

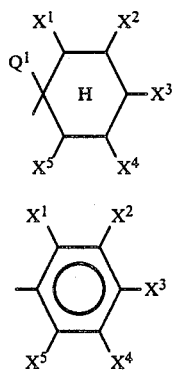

wherein $Q^1$ is H, alkyl or alkoxy each of 1–5 C atoms, F, Cl, Br or CN, each of $X^1$ or $X^5$ independently is H, alkyl of up to 15 C atoms or alkyl of 1–15 C-atoms in which one or two non-adjacent $CH_2$ groups are replaced by —O—, —S—, —O—CO—O—, —O—CO—NH—, —CO—, —CO—O—, —CO—S—, —S—CO—, —SO— or —$SO_2$—, with the proviso that at least two of $X^1$ to $X^5$ are different from H.

2. A polymer of claim 1 which is a homopolymer.

3. A polymer of claim 1 which is a copolymer wherein all mesogenic groups are of formula Ia or both Ia and Ib.

4. A polymer of claim 1 wherein said mesogenic groups Ia and Ib are attached to the polymer backbone by a spacer group which is $C_{1-21}$alkylene, $C_{1-21}$-alkylene substituted by halo, CN, or $C_{1-5}$alkyl, $C_{1-21}$-alkylene wherein one or two non-adjacent $CH_2$-groups are replaced by —O—, —S—, —O—CO—, —CO—O—, —S—CO—, —CO—S—, —SO— or —$SO_2$, or $C_{1-21}$-alkylene wherein two adjacent $CH_2$ groups are replaced by —C≡C— or —CH=CX—, wherein X is H, halo, CN or $C_{1-5}$-alkyl.

5. A polymer of claim 1 wherein in all groups Ia and Ib, at least 3 of $X^1$ to $X^5$ are not H.

6. A polymer of claim 1 wherein in all groups Ia and Ib, all of $X^1$ to $X^5$ are not H.

7. A polymer of claim 6 wherein in all groups Ia and Ib, all of $X^1$ to $X^5$ are the same.

8. A polymer of claim 1 wherein in all groups Ia and Ib, in each of $X^1$ to $X^5$, there is contained —O—, —S—, —CO—, —CO—O—, —SO—, or —$SO_2$—.

9. A polymer of claim 4 wherein the groups Ia and Ib are attached by —$(CH_2)_n$—$Q_2$—, wherein $Q_2$ is a single bond, —CO—S—, —CO—O—, —O—CO—, —CO—, —O—, —S—, —SO— or —$SO_2$—, and n is 3–20.

10. A polymer of claim 4 prepared by polymerizing at least one compound of the formula Y-spacer-M, wherein Y is $C_{2-5}$-alkenyl attached at the $\omega$ or ($\omega$-1) position, "spacer" is as defined in claim 4 and M is a group Ia or both Ia and Ib, and wherein Y is attached to "spacer" directly or by a group —O—, —S—, —SO—, —$SO_2$—, —CO—O—, —CO—NH—, —O—CO—NH—, or —O—CO—O.

11. A polymer of claim 4 prepared by grafting at least one compound of the formula Y-spacer-M to a polymer backbone wherein, Y is hydroxy, amino, alkenyl, mercapto, epoxy, carboxy or a reactive carboxy derivative, "spacer" is as defined in claim 4 and M is a group Ia or Ib.

12. A polymer of claim 1 wherein the backbone is that of an organopolysiloxane.

13. A polymer of claim 1 which is a copolymer further comprising chiral groups attached to the polymer backbone.

14. In an anisotropic composition comprising an organic polymeric material useful in electromagnetic applications, the improvement wherein the polymer material is an anisotropic polymer material of claim 1.

15. The composition of claim 14 in the form of a fiber or foil.

16. A polymer of claim 1, wherein the mesogenic groups are of the formula Ia.

* * * * *